No. 834,574. PATENTED OCT. 30, 1906.
C. U. HAYNES.
DRIVING AXLE FOR AUTOMOBILES.
APPLICATION FILED OCT. 23, 1905.

Witnesses:
Robert A. Jewett
Roswell F. Hatch

Inventor:
Clarence U. Haynes,
by Walter E. Lombard,
Atty.

UNITED STATES PATENT OFFICE.

CLARENCE U. HAYNES, OF ROME, NEW YORK.

DRIVING-AXLE FOR AUTOMOBILES.

No. 834,574.   Specification of Letters Patent.   Patented Oct. 30, 1906.

Application filed October 23, 1905. Serial No. 283,898.

*To all whom it may concern:*

Be it known that I, CLARENCE U. HAYNES, a citizen of the United States of America, and a resident of Rome, in the county of Oneida and State of New York, have invented certain new and useful Improvements in Driving-Axles for Automobiles, of which the following is a specification.

This invention relates to driving mechanisms for motor-vehicles, and has for its object the production of a device in which an undivided supporting rear axle may be used the ends of which are provided with differential mechanism within the hubs of the driving-wheels, whereby said wheels may be driven in unison in either direction when the vehicle is moving ahead or to the rear or independently of each other when the vehicle is making a turn.

The invention consists in certain novel features of construction and arrangement of parts, which will be readily understood by reference to the description of the drawings and to the claims to be hereinafter given.

Figure 1:
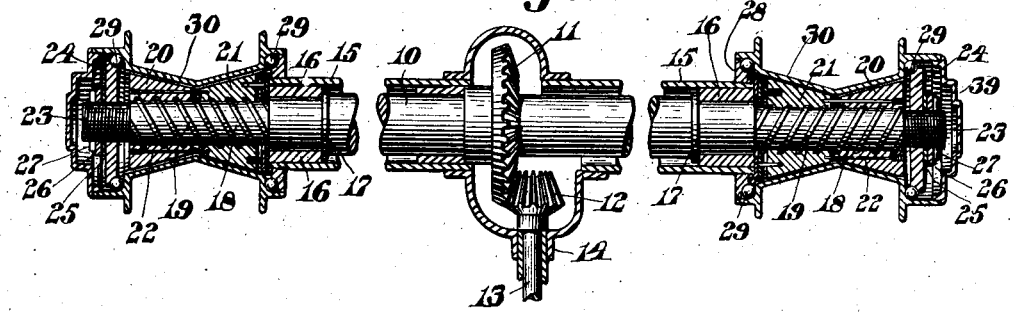
Figure 2:
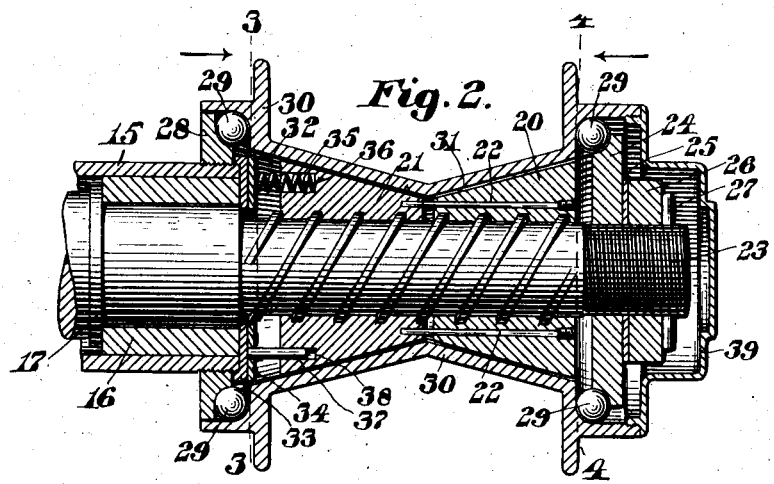
Figure 3:
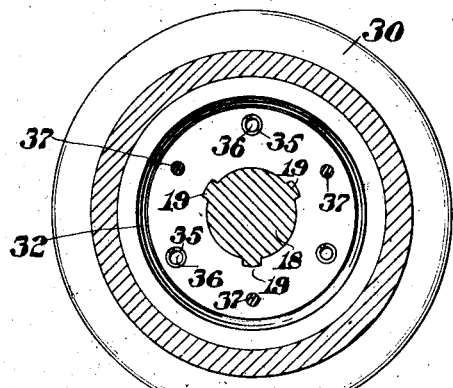
Figure 4:
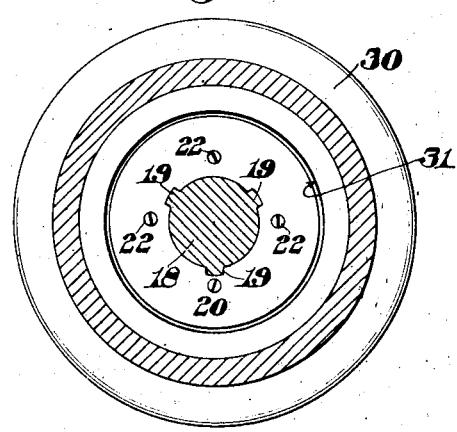

Of the drawings, Figure 1 represents a sectional plan of a rear driving-axle for a motor-vehicle, showing the hubs of the driving-wheel applied thereto. Fig. 2 represents a similar section of one end of said axle drawn to an enlarged scale. Fig. 3 represents a section on line 3 3 on Fig. 2 looking in the direction of the arrow, and Fig. 4 represents a section on line 4 4 on Fig. 2 looking in the direction of the arrow.

Similar characters designate like parts throughout the several figures of the drawings.

In the drawings, 10 represents the rear driving-axle of a motor-vehicle, to which is secured a bevel-gear 11, meshing with a bevel-pinion 12, secured to a revoluble shaft 13, mounted in a suitable bearing 14. The shaft 13 is driven by the motor (not shown) in any ordinary manner. The axle 10 is mounted in a casing 15, provided at either end with bearings 16 for said axle. Collars or shoulders 17 are provided upon said axle to limit its movement in either direction, said shoulders or collars 17 bearing against the inner faces of the bearings 16. Outside of each of the bearings 16 the axle is provided with an extension 18, having a male thread 19 thereon. The threads 19 of the extension 18 extend around the same in opposite directions, as indicated in Fig. 1.

On each of the extensions 18 is mounted the cone-nuts 20 21, provided with female threads coöperating with the thread 19. A plurality of adjusting members 22 are threaded to the cone-nut 20 and extend into the cone-nut 21, causing the two nuts to rotate together and maintain the same axial relation toward each other. The outer end of the extension 18 is provided with a threaded portion 23, on which is screwed a bearing-plate 24, held in position by the washer 25, nut 26, and pin 27.

The casing 15 has likewise threaded thereto a bearing-plate 28. These bearing-plates 24 28 are provided with grooves which form a bearing-surface for a plurality of antifriction members or balls 29, supporting the hub 30 of the driving-wheel. It is obvious that the hub 30 will freely turn upon the balls 29. The hub 30 is provided with interior cone-surfaces 31 32, with which the outer surfaces of the cone-nuts 20 21 are adapted to coöperate when desired. Threaded to the casing 15 is a friction-plate 33, against which a second friction-plate 34 is held by means of the springs 35, mounted in sockets 36 in the cone-nut 21.

The plate 34 is provided with a plurality of members or extensions 37 entering recesses 38 in said nut 21 and causing the plate 34 and nut 21 to rotate in unison. The hub 30 of the driving-wheel is provided at its outer end with a cup-shaped closing member 39 to protect the various working parts and prevent dust or other foreign substances from interfering with the proper working thereof.

In the operation of the invention when the axle 10 is rotated by the driving-gears 11 12 to move the vehicle ahead the threads 19 on the extensions 18 being right and left handed will act upon the cone-nuts 21 to move them from each other, bringing their outer surfaces into engagement with the bearing-surfaces 32 of the hubs 30, thereby serving as a clutch to cause the wheels, of which these hubs form a part to drive the vehicle ahead.

When the driving-gears 11 12 cause the axle 10 to rotate in the opposite direction, the threads 19 will act upon the cone-nuts 20 to move said nuts toward each other to clutch the hub 30, and thereby cause the wheels, of which said hubs form a part, to rotate in a direction to move the vehicle backward.

When the vehicle is running around a curve, the inside wheel maintains its normal speed, while the outside wheel necessarily runs faster than the inside wheel, and in so doing the outside wheel turning on the axle 10 causes the cone-clutch to be operated upon by the threads 19 to move it from contact with the bearing-surface 31, thereby permitting said outer wheel to turn freely on the antifriction members 29.

In motor-vehicles provided with the usual differential gearing when making turns the outer wheel usually maintains its normal speed, while the inner wheel is driven at a lesser speed, causing the driving to be done by the wheel having the least work to do. This oftentimes causes skidding and is liable to injure the driving mechanism and also the wheel-tires. By means of the present invention these objections are entirely obviated.

With the foregoing description it is believed the operation of the invention will be thoroughly understood.

Having thus described my invention, I claim—

1. The combination with a revoluble axle provided with a right external thread at one end and a left external thread at the other end, of two cone-shaped clutch members threaded to each end, and a wheel-hub mounted freely upon each end of said axle and adapted to be engaged by either one of said clutch members to drive the same.

2. The combination with a revoluble axle provided at one end with a right external thread and at the other end with a left external thread, of two cone-shaped clutch members threaded to each end, and a wheel-hub mounted freely upon each end of said axle and provided with internal clutch-surfaces in the form of two cones converging toward each other which are adapted to be engaged by one of said clutch members to drive the same.

3. The combination with a revoluble axle provided with a right external thread at one end and a left external thread at the other end, of cone clutch members threaded thereon, antifriction members preventing the accidental rotation of said clutch members, and a wheel-hub on either end of said axle provided with clutch-surfaces adapted to be engaged by said clutch members to rotate said hub.

4. The combination with a revoluble axle provided with a right external thread at one end and a left external thread at the other end, of cone clutch members threaded thereon, a stationary bearing-surface, a friction member revoluble with said clutch members, and a spring interposed between said clutch members and said friction member.

5. The combination with a revoluble axle provided with a right external thread at one end and a left external thread at the other end, of two cone clutch members threaded to each end, and a wheel-hub mounted freely upon each end of said axle and provided with internal clutch-surfaces in the form of two opposed cones adapted to be engaged by one of said clutch members to drive the same.

6. The combination with a revoluble axle provided with a right external thread at one end and a left external thread at the other end, of two cone clutch members threaded to each end, means extending from one clutch member into its mate, and a wheel-hub mounted freely upon each end of said axle and provided with internal clutch-surfaces in the form of two opposed cones adapted to be engaged by one of said clutch members to drive the same.

7. The combination with a revoluble axle provided with a right external thread at one end and a left external thread at the other end, of two cone clutch members threaded to each end, adjustable means extending from one clutch member into its mate limiting the movement of said members toward each other, and a wheel-hub mounted freely upon each end of said axle and provided with internal clutch-surfaces in the form of two opposed cones adapted to be engaged by one of said clutch members to drive the same.

Signed by me at Rome, New York, this 20th day of October, 1905.

CLARENCE U. HAYNES.

Witnesses:
P. R. HUGGINS,
M. F. CAVELLIR.